US007853465B2

(12) United States Patent
Molesky

(10) Patent No.: US 7,853,465 B2
(45) Date of Patent: Dec. 14, 2010

(54) METHODS AND APPARATUS TO PRESENT EVENT INFORMATION WITH RESPECT TO A TIMELINE

(75) Inventor: Lory Dean Molesky, Lexington, MA (US)

(73) Assignee: Oracle International Corp., Redwood Shores, CA (US)

( * ) Notice: Subject to any disclaimer, the term of this patent is extended or adjusted under 35 U.S.C. 154(b) by 1249 days.

(21) Appl. No.: 11/293,545

(22) Filed: Dec. 2, 2005

(65) Prior Publication Data

US 2007/0136296 A1    Jun. 14, 2007

(51) Int. Cl.
G06F 9/44 (2006.01)
(52) U.S. Cl. .......................................................... 705/7
(58) Field of Classification Search ...................... 705/7
See application file for complete search history.

(56) References Cited

U.S. PATENT DOCUMENTS

| | | | | |
|---|---|---|---|---|
| 7,143,091 | B2 * | 11/2006 | Charnock et al. | 707/5 |
| 7,213,600 | B2 * | 5/2007 | El-Nokaly et al. | 128/898 |
| 7,448,046 | B2 * | 11/2008 | Navani et al. | 719/316 |
| 7,493,591 | B2 * | 2/2009 | Charisius et al. | 717/100 |
| 2005/0097536 | A1 * | 5/2005 | Bernstein et al. | 717/156 |
| 2005/0246119 | A1 * | 11/2005 | Koodali | 702/79 |

OTHER PUBLICATIONS

Tim Pyron. Chapter 19, Special Edition Using® Microsoft® Office Project 2003, Que, Feb. 3, 2004; Print ISBN-10: 0/7897-3072-3; Print ISBN-13: 978-0-7897-3072-5.*
Ganesan Shankaranarayan, Mostafa Ziad, Richard Y. Wang "Managing Data Quality in Dynamic Decision Environments: An Information Product Approach," Journal of Database Management, vol. 14, Issue 4, 2003.*
Harry Hochheiser, Ben Shneiderman. "Visual Specification of Queries for Finding Patterns in Time-Series Data," Proceedings of Discovery Science 2001, 441-446. Washington, DC, Nov. 2001.*
Ming-Chien Shan, James W. Davis, Weimin Du, and Qiming Chen. "Business Process Flow Management and its Application in the Telecommunications Management Network," Hewlett-Packard Journal, Oct. 1996.*
Tim Pyron. Chapter 19, Annotated, Special Edition Using® Microsoft® Office Project 2003, Que, Feb. 3, 2004; Print ISBN-10: 0-7897-3072-3; Print ISBN-13: 978-0-7897-3072-5.*
Stover, Teresa, Microsoft Office Project 2003 Inside Out. part of Ch 11, annotated. Microsoft Press, Oct. 2003, ISBN-10: 0-7356-1958-1.*

* cited by examiner

*Primary Examiner*—Romain Jeanty
*Assistant Examiner*—George H Walker

(57) ABSTRACT

A charting application generates a so-called timelink chart. To generate the timelink chart, the charting application renders a timeline axis representing a segment of time. The charting application further renders a business event axis in (orthogonal) relation to the timeline axis. Positions on the business event axis indicate respective types of business events that can occur. For each of multiple business events associated with a respective business activity, the charting application generates a corresponding event instance with respect to the business event axis and the timeline axis to indicate a type associated with a respective business event of the multiple business events and when the respective business event occurs in time. In a final step, the charting application generates a graphical link connecting multiple event instances (associated with the respective business activity) in the timelink chart to display a progression of the respective business activity over time.

22 Claims, 10 Drawing Sheets

METHODS AND APPARATUS TO PRESENT EVENT INFORMATION WITH RESPECT TO A TIMELINE

BACKGROUND

Software application programs have long been used to perform tasks for computer users. For example, one type of software application program creates so-called Gantt charts. In general, a Gantt chart is a schedule showing when different types of tasks will be performed with respect to each other in an overall project including many tasks.

One axis of a Gantt chart represents time. Another axis (which is orthogonal with respect to the time axis) of the Gantt chart indicates different types of scheduled tasks such as research, development, testing, etc. that occur in a respective project.

Typically, a Gantt chart includes respective ranges of time required to complete multiple corresponding tasks. The beginning of a respective time range in the Gantt chart identifies when the respective task should be started. The end of the respective time range identifies when the respective task should be completed. In certain cases, the time ranges associated with respective tasks in the Gantt chart typically overlap with each other to reduce an overall schedule of time required to complete a respective project.

A Gantt chart can be used for a number of purposes. For example, the Gantt chart can indicate which of multiple tasks can be performed at the same time as well as which other tasks that must occur one after the other. In addition to time ranges, a Gantt chart can include critical milestones (usually appearing in relation to a respective time range) that must be met in order to prevent an entire project schedule from slipping.

SUMMARY

As discussed above, conventional software charting tools that generate Gantt charts and the like are quite useful because they enable managers to visualize different components associated with a respective task schedule. However, conventional software charting tools do not provide an easy way for a viewer to identify a causal relationship amongst a group of events that occur over time. Nor do Gantt charts enable one to track multiple projects at the same time using the same chart. Additionally, the time ranges in a Gantt chart typically illustrate when events are expected to occur rather than when events have actually occurred.

Novel techniques discussed herein deviate with respect to conventional applications such as those discussed above as well as additional techniques known in the prior art. In particular, certain embodiments herein are directed to generation of a chart (e.g., a so-called timelink chart) including groupings of events associated with respective business activity flows. Connectivity of the events in a respective grouping of events enables a viewer to quickly identify which events of multiple events are related and a course of how the related events progress over time. In one embodiment, a group of related events in a timelink chart represent business events that occur with respect to a corresponding business activity.

More specifically, according to one embodiment, a timelink chart herein includes orthogonal axes such as a first axis and a second axis. The first axis of the timelink chart is a timeline. The second axis of the timelink chart indicates (via respective labeling) different types of events that can occur over time. The timelink chart includes corresponding event markers (indicating occurrence of events) located with respect to first axis and the second axis to indicate when different types of events occur over time.

A group of related events (e.g., shown as event instances or event markers) in the timelink chart are connected via a physical link such as a line or other visual indication. Based on connectivity amongst events in the timelink chart, a reviewer can quickly identify a group of events associated with a respective business activity flow. Further, the reviewer can quickly identify the progression of events that occur over time for a respective business activity flow.

According to a further aspect herein, a timelink chart can include multiple groupings of events associated with multiple business activities. Each grouping of events includes a visual indication such as a respective link connecting or linking the events in the same group. Based on this technique, an individual viewing the chart can graphically compare groupings of related events and, thus, more easily compare different business activity flows on the same timelink chart. For example, the viewer can compare a first group of related events associated with a first business activity flow to a second set of related events associated with a second business activity flow, and so on.

Thus, in the context of charting business activity flows according to one embodiment, a charting application (that generates the chart herein) renders a timeline axis that represents a segment of time. The charting application further renders a business event axis in relation to the timeline axis. Positions on the business event axis correspond to respective types of business events that can occur during one or more business activities. For each of multiple business events associated with a respective business activity, the charting application generates a corresponding event instance (e.g., a visual event marker) with respect to the business event axis and the timeline axis to indicate a type associated with a respective business event of the multiple business events and when the respective business event occurs in time. The charting application generates a graphical link amongst multiple event instances associated with the respective business activity to display a progression of the respective business activity over time.

As suggested above, the charting application herein can generate corresponding event instances associated with multiple business activity flows such as a first business activity flow, a second business activity flow, etc. For each of multiple business events associated with a first business activity, the charting application generates corresponding event instances with respect to the business event axis and the timeline axis (e.g., of a respective timelink chart) to indicate event types associated with the first business activity and when the respective business events of the first business activity occur in time. In a similar way, the charting application herein generates corresponding event instances (associated with the second business activity) with respect to the business event axis and the timeline axis to indicate event types associated with the second business activity and when the respective business events occur in time. The charting application repeats this process for each business activity flow shown in the timelink chart.

In furtherance of the above techniques describing connectivity of events associated with the same business activity flow, the charting application herein can generate a first graphical link amongst multiple event instances associated with the first business activity to display a progression of the first business activity over time. Additionally, the charting application can generate a second graphical link amongst multiple event instances associated with the second business activity to display a progression of the second business activity over time. The graphical links can be color-coded, pattern-coded, etc. so that a reviewer can identify one business activity flow from another or groups of business activity flows from others.

Additional embodiments herein include a computerized device, workstation, handheld or laptop computer, or the like configured with software and/or circuitry (e.g., a processor) to process any or all of the method operations disclosed herein. In other words, a computerized device, a processor, or logic circuitry that can be programmed or configured to operate as explained herein is considered an embodiment herein. This latter embodiment provides a hardware platform on which to execute a charting application according to embodiments herein.

Yet other embodiments herein include software programs to perform the steps and operations summarized above and disclosed in detail below. One such embodiment comprises a computer program product that has a computer-readable medium including computer program logic encoded thereon that, when performed in a computerized device having memory, a processor, and a respective display screen, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular technique herein is directed to a computer program product that includes a computer readable medium having instructions stored thereon for charting an occurrence of events over time. The instructions, when carried out by a processor of a respective computer device, cause the processor to perform or initiate the steps of: i) rendering a timeline axis that represents a segment of time; ii) rendering a business event axis in relation to the timeline axis, positions on the business event axis corresponding to respective types of business events that can occur during a business activity; iii) for each of multiple business events associated with a respective business activity, generating a corresponding event instance with respect to the business event axis and the timeline axis to indicate a type associated with a respective business event of the multiple business events and when the respective business event occurs in time; and iv) generating a graphical link amongst multiple event instances associated with the respective business activity to display a progression of the respective business activity over time. Other embodiments of the present application include software programs to perform any of the method embodiment steps and operations summarized above and disclosed in detail below.

As discussed above, techniques herein are well suited for presenting event information in a chart for purposes of business activity monitoring as well as reviewing occurrence of real-time events that trigger rules in a rule-based system. However, it should be noted that embodiments herein are not limited for use in such applications and that the techniques discussed herein are well suited for other purposes as well.

It is to be understood that the system can be embodied strictly as a software program, as software and hardware, or as hardware alone and may be implemented within one or more computer systems. Example embodiments may be implemented within the Oracle Software applications manufactured by Oracle Corporation of Redwood Shores, Calif., USA. Additional features of the embodiments herein will be further discussed in the Detailed Description section of this application and accompanying figures.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to an example embodiment, a charting application generates a so-called timelink chart. To generate the timelink chart, the charting application renders a timeline axis representing a segment of time. The charting application further renders an event axis in (orthogonal) relation to the timeline axis. Positions on the event axis indicate respective types of events that can occur. For each of multiple events associated with a respective activity, one embodiment of the charting application herein generates a corresponding event instance with respect to the event axis and the timeline axis to indicate a type associated with a respective event of the multiple events and when the respective event occurs in time. Further, the charting application herein generates a graphical link connecting multiple event instances (associated with the respective activity) in the timelink chart to display a progression of the respective activity over time. According to one technique herein, the timelink chart includes multiple sets of connected events representing corresponding multiple business activity flows.

Figure 1:
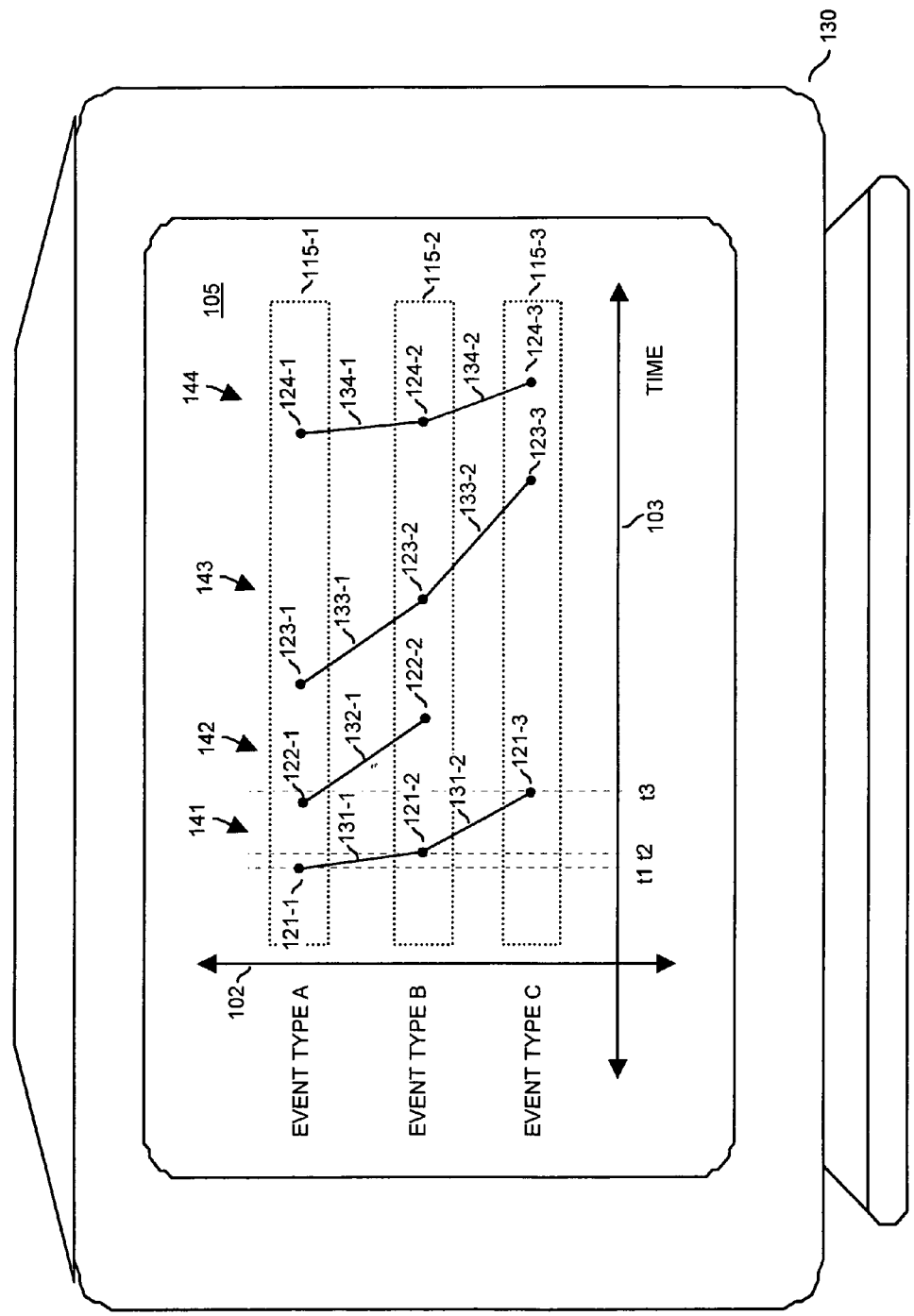
FIG. 1 is a diagram of a display screen including a graphical user interface according to an embodiment herein.

FIG. 1 is a diagram of display screen 130 displaying a chart 105 according to an embodiment herein. Note that chart 105 can appear on many different types of viewing media. For example, in the example shown, chart 105 appears on display screen 130. In other embodiments, the charting application herein prints the chart 105 on a viewing medium such as a paper, overhead slide, picture, web page, etc.

As shown, based on execution of a corresponding charting application as will be described further in this disclosure, chart 105 on display screen 130 includes an event axis 102 and a time axis 103. The event axis 102 includes different types of events that can occur for a respective type of activity or activities. In this example, event axis 102 includes event type A, event type B, and event type C. In the embodiment shown, the event axis 102 is disposed orthogonal to the time axis 103.

Each respective display region 115 appearing as a row parallel to the time axis 103 includes respective type of events that occur over time. For example, display region 115-1 includes type A events; display region 115-2 includes type B events; display region 115-3 includes type C events, and so on. The time axis (e.g., a real-time scale) indicates when the different events occur.

Note that the charting application herein displays events in the respective display regions 115 according to a type of event and when the event occurs. For example, event 121-1 (e.g., an event instance) is a type A event and occurs at time t1. Event 121-2 is a type B event and occurs at time t2. Event 121-3 is a type C event and occurs at time t3. Thus, based on where the events (or event instances) line up on the event axis 102 and the time axis 103, the viewer can identify types of events and when any of the events occur over time.

The charting application herein provides a visual indication of events that are related to each other. For example, as indicated by respective links 131-1 and 131-2, events 121-1, 121-2, and 121-3 correspond to activity 141 (e.g., business activity). In a similar way, link 132-1 indicates that event 122-1 and event 122-2 are related to activity 142. Links 133-1 and 133-2 indicate that event 123-1, event 123-2, and event 123-3 are related to activity 143. Links 134-1 and 134-2 indicate that event 124-1, event 124-2, and event 124-3 are related to activity 144. Thus, based on contents of chart 105, a viewer (such as a business analyst) can identify a respective flow associated with each related group of events as well as compare groupings of related events or activities with each other. As an example, a viewer can compare activities and specifically identify that activity 141 completed more quickly than activity 143. Additionally, the viewer can identify that activity 142 never terminated with a type C event, unlike activities 141, 143, and 144, which happen to end with a respective type C event.

Figure 2:
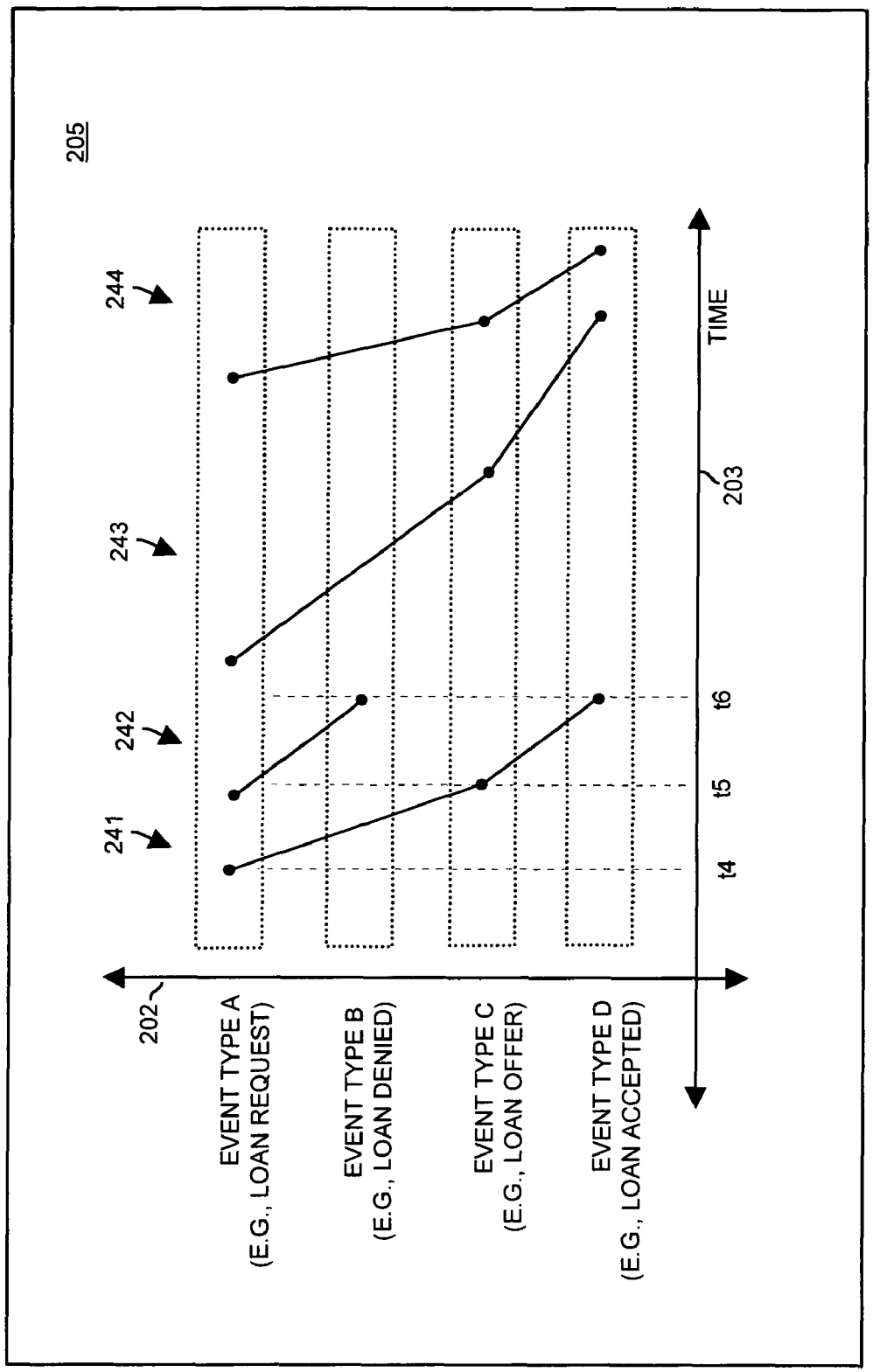
FIG. 2 is a diagram of a sample timelink chart on a viewing medium such as paper according to an embodiment herein.

FIG. 2 is a sample diagram of chart 205 generated by a respective charting application according to an embodiment herein. The charting application herein labels respective points on the event axis 202 such that a sequence of different business event types (e.g., event type A, event type B, etc.) on the event axis 102 progresses from an initial event type to an ending event type. For example, the first (e.g., highest) type of event (e.g., event type A) on event axis 202 corresponds to "loan request" events. The second type of event (e.g., event type B) down the event axis 202 corresponds to "loan denial" events. The third type of event (e.g., event type C) down the event axis 202 corresponds to "loan offer" events. The fourth type of event (e.g., event type D) down the event axis 202 corresponds to "loan acceptance" events. Thus, according to one technique herein, the charting application generates a chart 205 including a causal ordering of multiple types of events that can occur during one or more corresponding business activities.

As discussed, chart 205 indicates respective business activity flows associated with processing loan applications. For example, business activity flow 241 indicates that: i) a loan request occurs at time t4 for a respective loan associated with business activity flow 241, ii) the loan is offered to a client at time t5, and iii) terms of the loan associated with business activity flow 241 are accepted at time t6. For business activity flow 241, there is no respective dot indicating the occurrence of a type B event because the loan was not denied. Instead of ending with a type B event (i.e., denial), business activity flow 241 ends with a respective dot corresponding to an event type D because the corresponding loan ended with an acceptance, completing a loan cycle. Thus, according to one technique herein, a charting application generates event instances (e.g., dots corresponding to occurrence of respective events) for fewer than all of the respective types of events labeled on the event axis 202 that could occur during a respective business activity flow. The charting application herein thus can generate graphical links connecting the event instances but skip connection to at least one type of event identified by the event axis 202. For activity 241, event type B is skipped.

Business activity flows 243 and 244 and corresponding events occur at different times on time axis 203 but include a similar set of events as described for business activity flow 241. For example, each of these business activity flows indicates a respective occurrence of a type A event, a type B event, and a type C event. Thus, at least a portion of the activities shown in chart 205 can follow a similar pattern.

However, each business activity flow in the chart 205 need not identify the occurrence of the same set of events. For example, business activity flow 242 starts with a respective loan request at a corresponding time on time axis 203. However, instead of offering a respective loan to a requester, the respective loan is denied based on occurrence of a type B event. Accordingly, business activity flow 242 terminates early compared to business activity flows 241, 243, and 244. Thus, as discussed above, chart 205 can be useful to visually indicate the relative speed at which events occur for each of multiple business activity flows. Additionally, chart 205 graphically illustrates that each business activity flow does not always include occurrence of the same type of events. For example, as discussed, some business activity flows indicate skipping of certain types of events.

Figure 3:
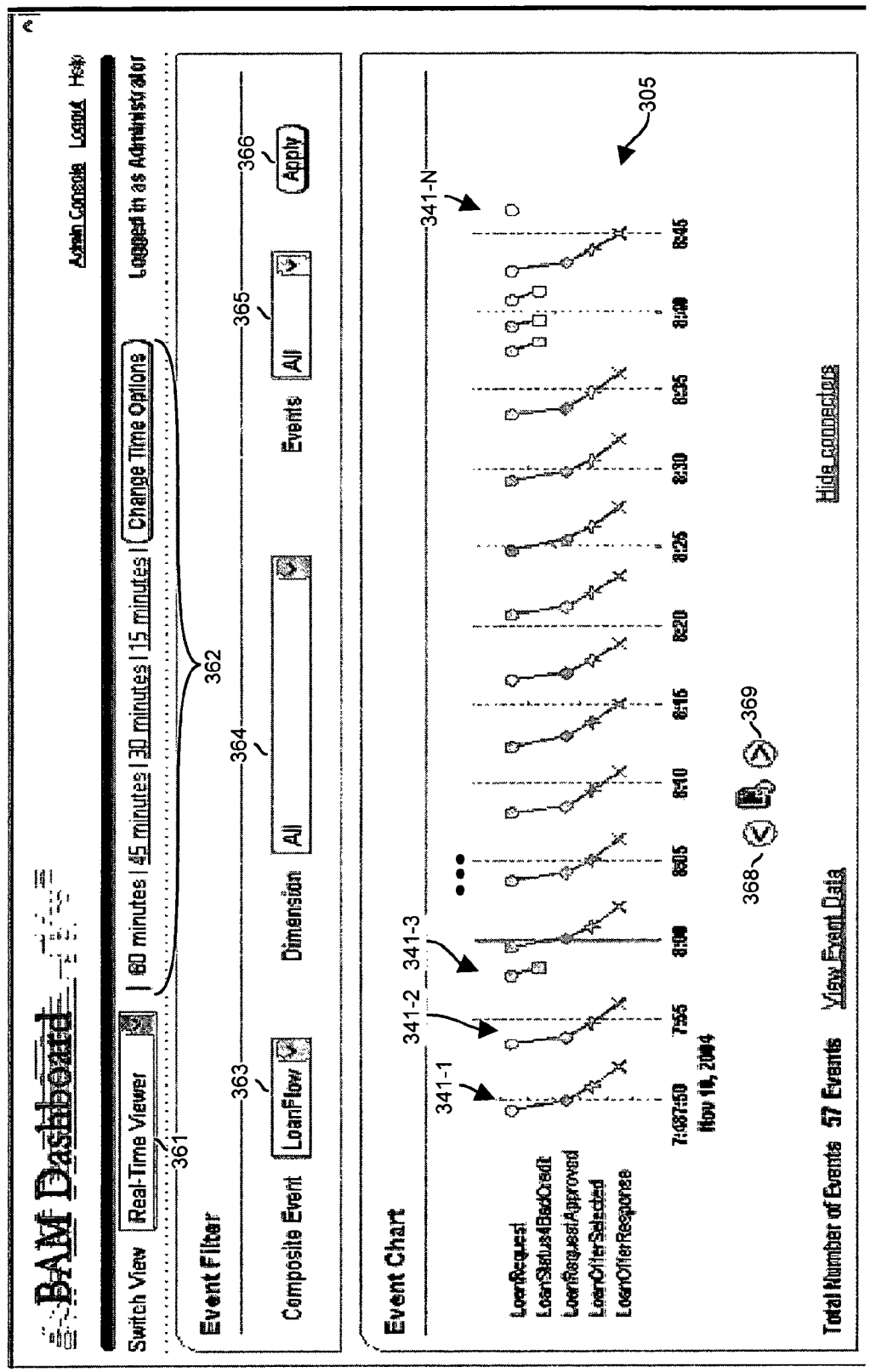
FIG. 3 is a detailed diagram of a graphical user interface for viewing information on a chart according to an embodiment herein.

FIG. 3 is a graphical user interface 350 enabling a business analyst to manipulate settings of a respective charting application that produces chart 305 on a corresponding display screen. Based on settings provided by the business analyst, the business analyst can more easily monitor respective business activity flows 341 (e.g., business activity flow 341-1, 341-2, 341-3, . . . , 341-N) in example chart 305.

As shown, setting 361 of graphical user interface 350 enables the business analyst to view a real-time view of business activity flows 341 (e.g., loan flows) in chart 305.

Setting 362 of graphical user interface 350 enables the business analyst to select a corresponding window of time for viewing business activity flows 341. Accordingly, the business analyst can zoom in and see more details of specific flows or zoom out and view more business activity flows at the same time.

Setting 363 of graphical user interface 350 enables the business analyst to select a type of business activity flows to view in chart 305. As discussed above, the present example chart 305 illustrates a real-time view of business activity flows 341 (e.g., loan flows) associated with loan applications.

Setting 364 of graphical user interface 350 enables the business analyst to select dimensions associated with chart 305.

Setting 365 of graphical user interface 350 enables the business analyst to select which type of events will be displayed in chart 305. Accordingly, the business analyst can filter out events that are not of interest.

After making a selection for settings 363, 364, and 365, the business analyst clicks on apply button 366 to activate the settings and view business activity flows in chart 305.

To further monitor business activity according to one technique herein, graphical user interface 350 can include scroll button 368 and scroll button 369. An action such as clicking on scroll button 368 scrolls a respective viewing window (for viewing business activity flows 341) to the left for viewing an earlier window of time. Clicking on scroll button 369 scrolls a respective viewing window (for viewing business activity flows 341) to the right for viewing a later window of time. Accordingly, the business analyst can select which window of time for viewing corresponding business activity flows.

In addition to the techniques above, a charting application herein can indicate which business activity flows 341 in chart 305 are associated with each other. For example, chart 305 can include business activity flows associated with multiple entities (e.g., people, machines, processes, etc.). Business activity flows can be color-coded, pattern-coded, etc. based on entity type originating or associated with the business activity flow so that a business analyst can compare business activity flows associated with a first entity to business activity flows associated with a second entity, and so on. Based on this technique, any part of the business activity flows such as link (e.g., a line connecting events) or event instances (e.g., markers such as a filled-in circle, filled-in square, plus sign, x, etc.) associated with a respective business activity flow can be differentiated based on a unique color, pattern, shading, etc.

According to one technique, a user viewing business activity flows on chart 305 can select one or more of the business activity flows and view corresponding statistical information in tabular form. For example, chart 305 can include an additional display region for displaying statistical information such as event counts that occur within a time window as well as information such as average response times associated with occurrence of events.

According to another technique, graphical user interface 350 (and/or underlying charting application) can include additional features such as a means for (e.g., software code) generating a graphical representation such as an "average" business activity flow from a group of business activity flows generated by the same or different entities. For example, a business analyst can select business activity flows associated with an entity such as a particular person that is responsible for processing a group of corresponding loan applications.

To generate an "average" business activity flow, the charting application herein collects timestamp information associated with multiple business activity flows. Assume in this example that each of business activity flow includes an occurrence of event type A, event type B, and event type C. Based on underlying data associated with the selected business activity flows, the charting application then calculates an average time difference between occurrence of event type A and event type B for each of the multiple business activity flows. Additionally, the charting application calculates and average time difference between occurrence of event type B and event type C for the multiple business activity flows. Based on these average time difference values between occurrence of events, the charting application generates a graphical representation of the average business activity flow on a timeline. That is, instead of (or in addition to) displaying each of the multiple business activity flows, the charting application can display a single "average" business activity flow (that represents a combination of multiple individual business activity flows) for analysis by a respective viewer such as a business analyst. Thus, a business analyst can review a single business activity flow rather than each of multiple business activity flows to identify a respective performance.

Thus, according to one technique herein, the "average" business activity flow is a single business activity flow representing an overall average of the business activity flows. This process can be repeated for each of multiple entities (and respective business activity flows) so that a respective business analyst can generate and compare respective "average" business activity flows with each other. For example, the charting application herein can generate a respective average business activity flow for each of multiple persons so that a business analyst can compare the average business activity flows with each other rather than rather than require the business analyst to compare multiple sets of business activity flows with respect to each other in order to identify, for example, which loan officers complete respective loan processing faster than others.

One purpose of generating an "average" business activity flow (as well as the individual business activity flows) in a timelink chart is to identify strengths and weaknesses of a person or machine associated with a group of average business activity flows. After identifying problem areas using chart 305, the business analyst may be able to provide feedback indicating how to improve productivity of the person or machine associated with the respective business activity flows.

According to further techniques herein, graphical user interface 350 enables a business analyst to click on a respective business activity flow and retrieve respective data. For example, a business analyst can click on a business activity flow to view specific details associated with the entity responsible for initiating respective business events, more details of the events themselves, etc.

Figure 4:
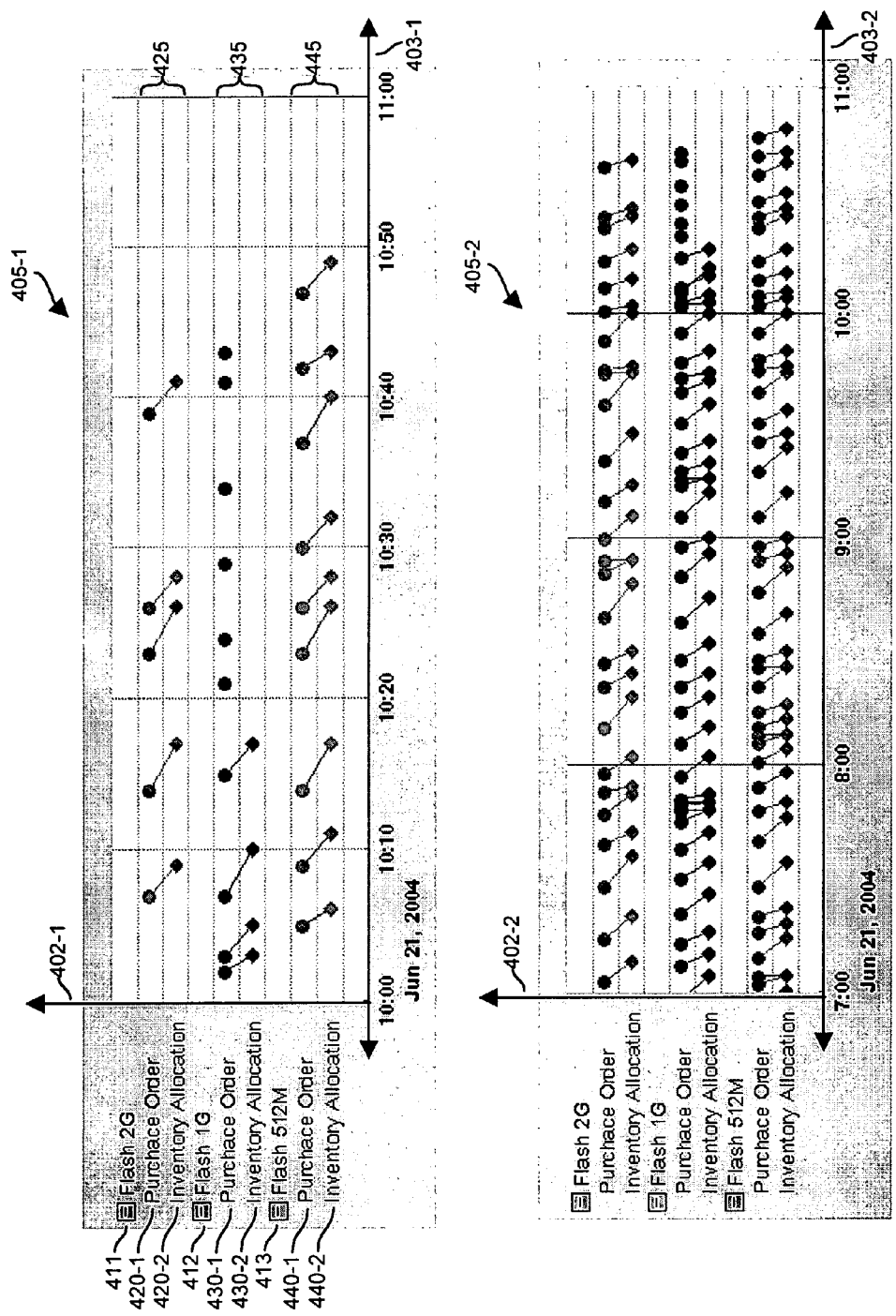
FIG. 4 is a diagram of timelink charts illustrating results of selecting a time window for viewing events and respective business activity flows according to an embodiment herein.

FIG. 4 is a diagram of chart 405-1 and chart 405-2 (collectively, charts 405) illustrating that the business analyst can adjust a time window to view more or less business activity flows on the same display medium according to further techniques herein. For example, chart 405-1 illustrates a narrower window of time (e.g., from 10:00 to 11:00) while chart 405-2 illustrates a wider window of time (e.g., from 7:00 to 11:00) when respective business activity flows occur.

As shown, the business event axis (e.g., business event axis 402-1 or business event axis 402-2) includes a first contiguous sequence of business types (e.g., business event 420-1 and business event 420-2) associated with a first type of business activity and a second contiguous sequence of business types (e.g., business event 430-1 and 430-2) associated with a second type of business activity.

More specifically, business event axis 402-1 displays events associated with each of 3 different manufacturing processes such as a first process associated with sales of flash 2 Gigabyte memory components, a second process associated with sales of flash 1 Gigabyte memory components, and a third process associated with sales of flash 512 Megabyte memory components. The chart 405-1 includes separate sets of business activity flows (e.g., business activity flows 425, business activity flows 435, and business activity flows 445). The processes are disconnected (e.g., independent) from each other, but which share a common time axis 403-1.

According to one technique herein, the charts 405 include functionality enabling the business analyst to minimize (e.g., to hide information) and expand (e.g., to display information) different types of events labeled on a respective business event axis 402-1. For example, the business analyst can click on display region 411 to hide business event 420-1 and business event 420-2 from appearing on the business event axis 402-1. When hidden (or when flash 2 G process is minimized), the charting application herein no longer displays business activity flows 425 in chart 405-1.

In a similar way, the business analyst can click on display region 412 to eliminate or hide business event 430-1 and business event 430-2 from appearing on the business event axis 402-1. When hidden (or when flash 1 G process 430-1 is minimized), the charting application herein no longer displays business activity flows 435 in chart 405-1.

Also, the business analyst can click on display region 413 to eliminate or hide business event 440-1 and business event 440-2 from appearing on the business event axis 402-1. When eliminated or hidden (or when flash 512 M process is minimized), the charting application herein no longer displays business activity flows 445 in chart 405-1. Accordingly, the business analyst can selectively populate charts 405 with respective business activity flows and more easily filter and compare data of interest by clicking on respective display regions 411, 412, and 413.

Figure 5:
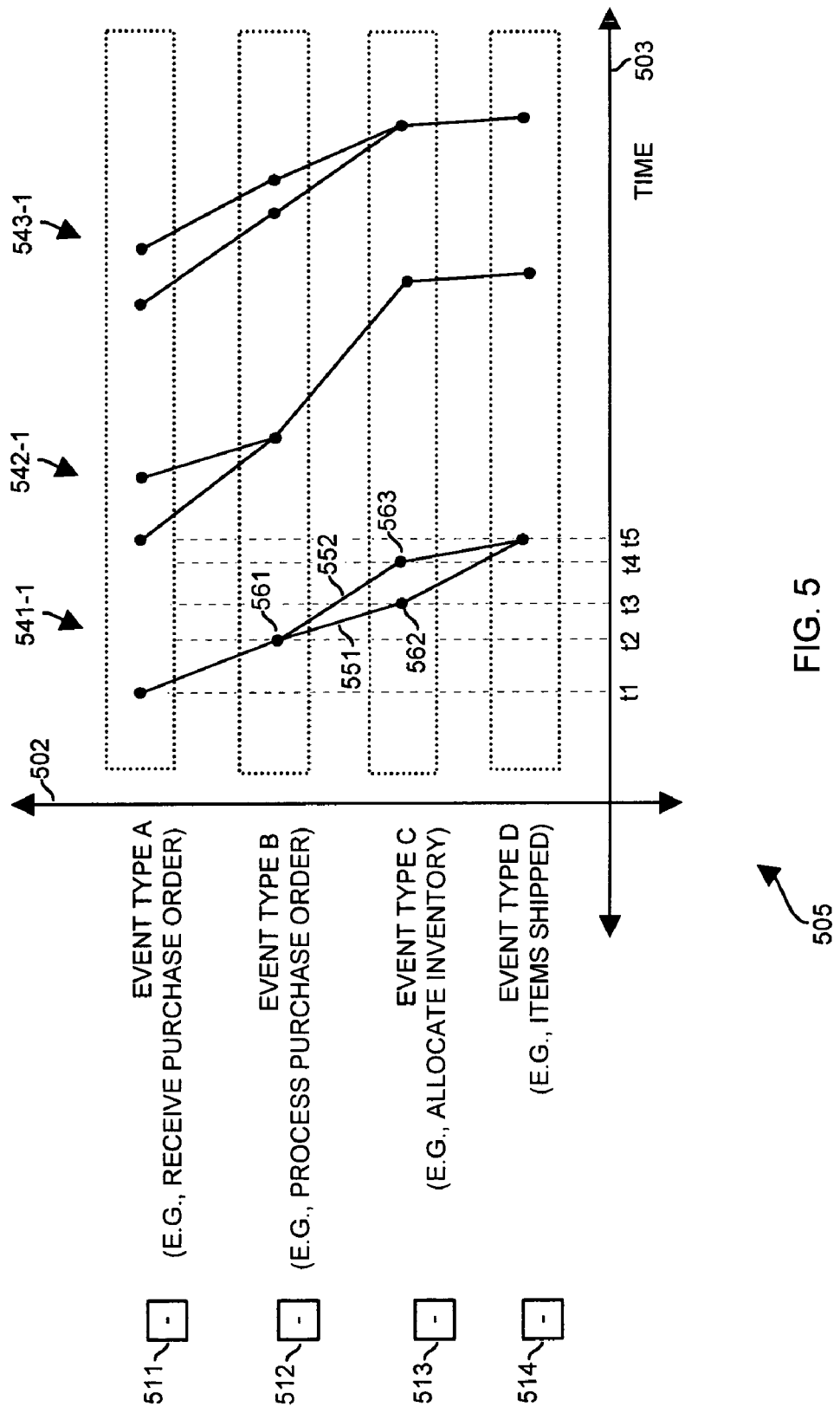
FIG. 5 is a diagram of a respective chart illustrating expansion of all types of events for viewing in a respective chart according to an embodiment herein.
Figure 6:
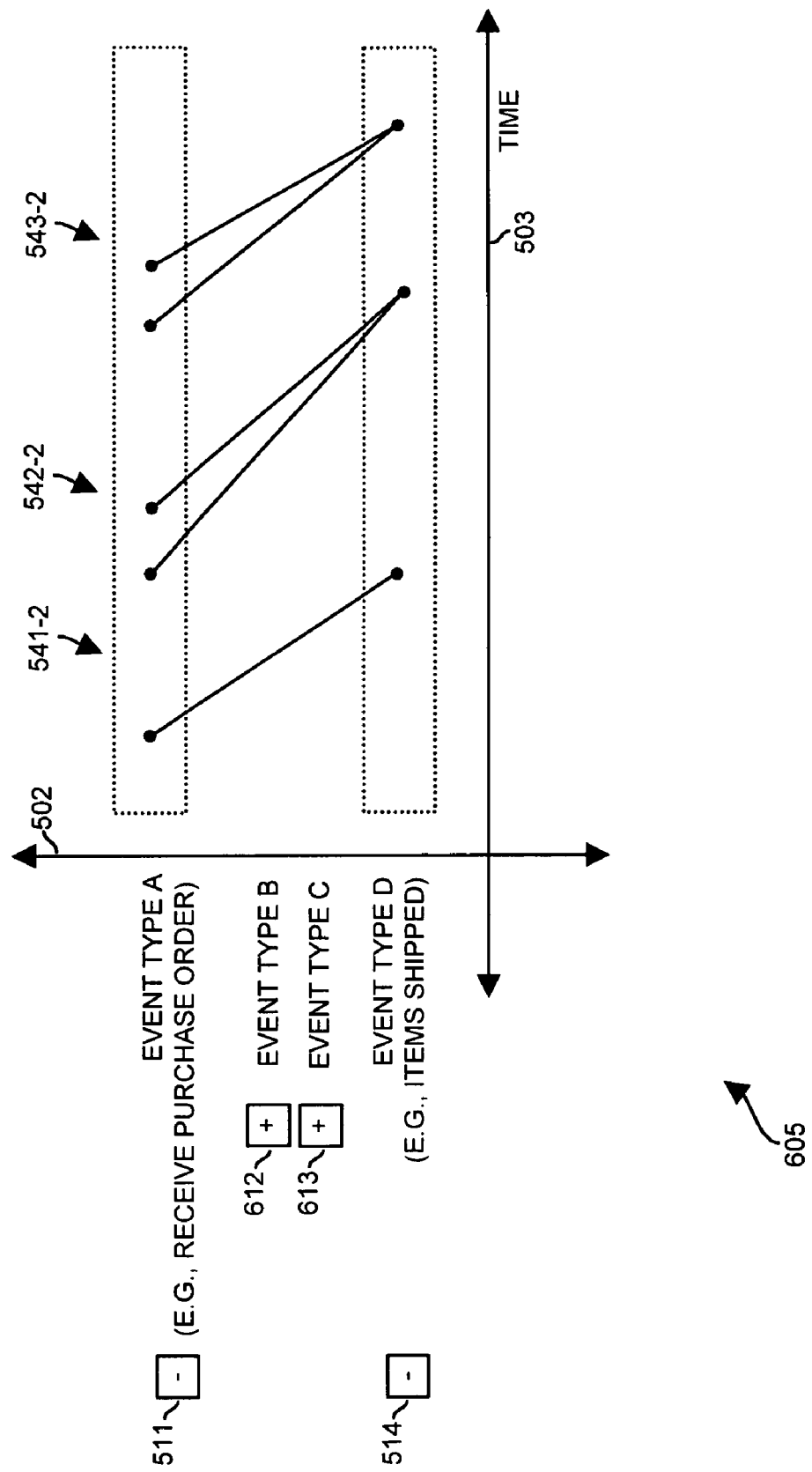
FIG. 6 is a diagram of a respective chart illustrating removal of selected types of events from a respective chart according to an embodiment herein.

FIGS. 5 and 6 more particularly illustrate a technique enabling the business analyst to modify a timelink chart according to an embodiment herein. For example, FIG. 5 illustrates chart 505 including business activity flow 541-1, business activity flow 542-1, and business activity flow 543-1 that are charted with respect to business event axis 502 and time axis 503 in a similar way as discussed above. Additionally, chart 505 includes display region 511 disposed in relation to event type A, display region 512 disposed in relation to event type B, display region 513 disposed in relation to event type C, and display region 514 disposed in relation to event type D. Clicking on the display regions results in minimization and removal of events from the corresponding business activity flows 541-1, 542-1, and 543-1.

As an example, assume that a business analyst viewing chart 505 clicks on display region 512 and display region 513. In response to such an action, the charting application herein produces chart 605 as shown in FIG. 6. In chart 605, event type B and event type C now include respective selectable display region 612 and display region 613 for reverting back to the chart 505 in FIG. 5, which includes these event types in the business activity flows.

As shown in chart 605 of FIG. 6, the business analyst causes certain types of events to business event removed (e.g., no longer displayed) from business activity flows 541-1, 542-1, and 542-1 by clicking on display region 512 and display region 513. More specifically, when a user clicks on display region 512 and display region 513 in chart 505, the charting application herein no longer displays events of type B or type C in the business activity flows 541-1, 542-1, and 543-1 as shown in chart 605. Thus, the business analyst can view chart 605 to view a business activity flows 541-2, business activity flow 542-2, and business activity flow 543-2 illustrating how long it takes to ship an ordered item, without having to view unwanted events such as event type B and event type C.

In a reverse manner, the business analyst can click on display region 612 and display region 613 to selectively add intervening events to the respective business activity flows in chart 605. For example, the business analyst can click on display region 612 and display region 613 to revert back the chart 505 shown in FIG. 5.

Referring again to FIG. 5, chart 505 illustrates multiple business activity flows as previously discussed. Note that a business activity flow as shown in chart 505 need not follow a linear path connecting all events with a single line. For example, business activity flow 541-1 includes reception of a respective purchase order (such as for 100 widgets) at time t1. The purchase order is processed at time t2. Inventory (such as 50 widgets) is allocated for the purchase order at time t3. Additionally, inventory (such as another 50 widgets) is allocated for the purchase order at time t4. The 100 widgets are shipped to the buyer at time t5.

Thus, according to one technique, the charting application herein can generate multiple bifurcating graphical links associated with a single business activity flow. For example, for a given business activity flow such as business activity flow 541-1, the charting application i) generates a first link 551 connecting a first event instance 561 of the first event type (i.e., type B) to a second event instance 562 of the second event type (i.e., type C), and ii) generates a second link 552 connecting the first event instance 561 of the first event type (i.e., type B) to a third event instance 563 of the second event type (i.e., type C).

Business activity flow 542-1 illustrates another case in which two purchase orders (potentially from the same client) received at successive points in time are processed at the same time.

Business activity flow 543-1 illustrates two purchase orders that are processed at different points in time but that inventory to fill the purchase orders is allocated (from, e.g., a container) or will be for available for shipping at the same time.

Figure 7:
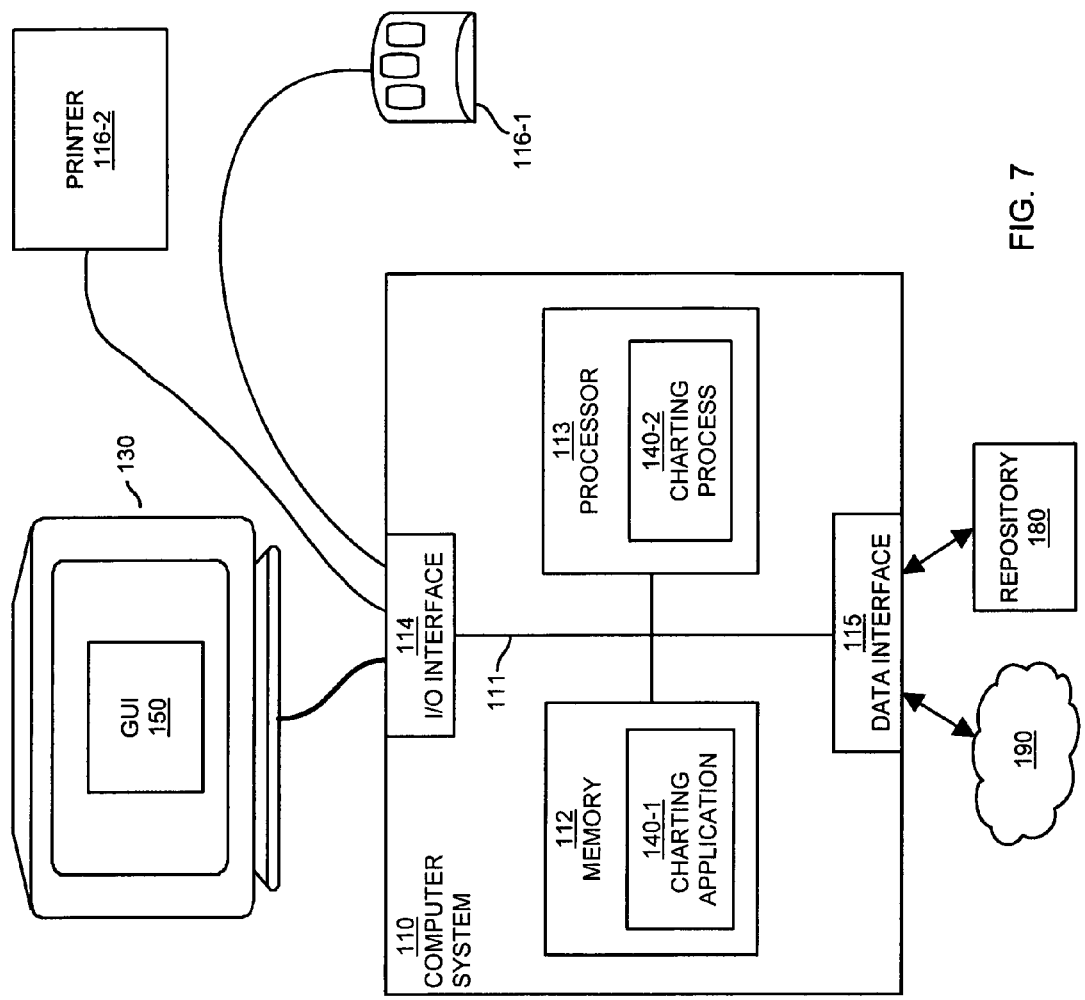
FIG. 7 is a sample platform for executing a respective charting application and generating charts according to an embodiment herein.

FIG. 7 is a block diagram of a computer environment 300 illustrating an example computer architecture for implementing a charting application 140-1 according to embodiments herein. Computer system 110 can be a computerized device such as a personal computer, workstation, portable computing device, console, network terminal, processing device, etc. As shown, computer system 110 of the present example includes an interconnect 111 that couples a memory system 112, a processor 113, I/O interface 114, and a data interface 115. The data interface is coupled to a network 190 such as a LAN or WAN (e.g., the Internet) or a repository 180 to retrieve data associated with business activity flows.

In one embodiment, information associated with respective business activity flows is stored in data structures such as linked lists. The linked lists can include information such as event names, time stamp information when respective events occur, etc. In addition to retrieval of data, data interface 115 enables computer system 110 to communicate over network 190 to locally or remotely store information if necessary. I/O interface 114 potentially provides connectivity to peripheral devices 116 such as a keyboard, mouse 116-1, display screen 130, printer 116-2, etc.

As shown, memory system 112 is encoded with a charting application 140-1 that enables a user to display business activity flows as previously discussed. Charting application 140-1 may be embodied as software code such as data and/or logic instructions (e.g., code stored in the memory or on another computer readable medium such as a disk) that supports processing functionality according to different embodiments described herein. During execution of charting application 140-1 by a respective business analyst, processor 113 accesses memory system 112 via the interconnect 111 in order to launch, run, execute, interpret or otherwise perform the logic instructions of the charting application 140-1. Execution of the charting application 140-1 produces processing functionality in charting process 140-2. In other words, the charting process 140-2 (as discussed herein) represents one or more portions of the charting application 140-1 performing within or upon the processor 113 of computer system 110.

It should be noted that, in addition to the charting process 140-2 as previously discussed, embodiments herein include the charting application 140-1 itself (i.e., the un-executed or non-performing logic instructions and/or data). In one embodiment, the charting application 140-1 can be stored on a computer readable medium such as a floppy disk, hard disk or in an optical medium. According to other embodiments, the charting application 140-1 herein can be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of charting application 140-1 in processor 113 as the charting process 140-2. Thus, those skilled in the art will understand that the computer system 110 can include other processes and/or software and hardware components, such as an operating system that enables a respective user to launch the charting application 140 and preview selected content.

Functionality supported by computer system 110 and, more particularly, functionality associated with charting application 140-1 and charting process 140-2 will now be discussed via flowcharts in FIGS. 8-10. For purposes of this discussion, computer system 110 or charting application 140 (e.g., charting application 140-1 and/or charting process 140-2) each can perform the processing steps in the flowcharts.

Note that there will be some overlap with respect to concepts discussed above for FIGS. 1-7. Also, note that the steps in the below flowcharts need not always be executed in the order shown.

Figure 8:
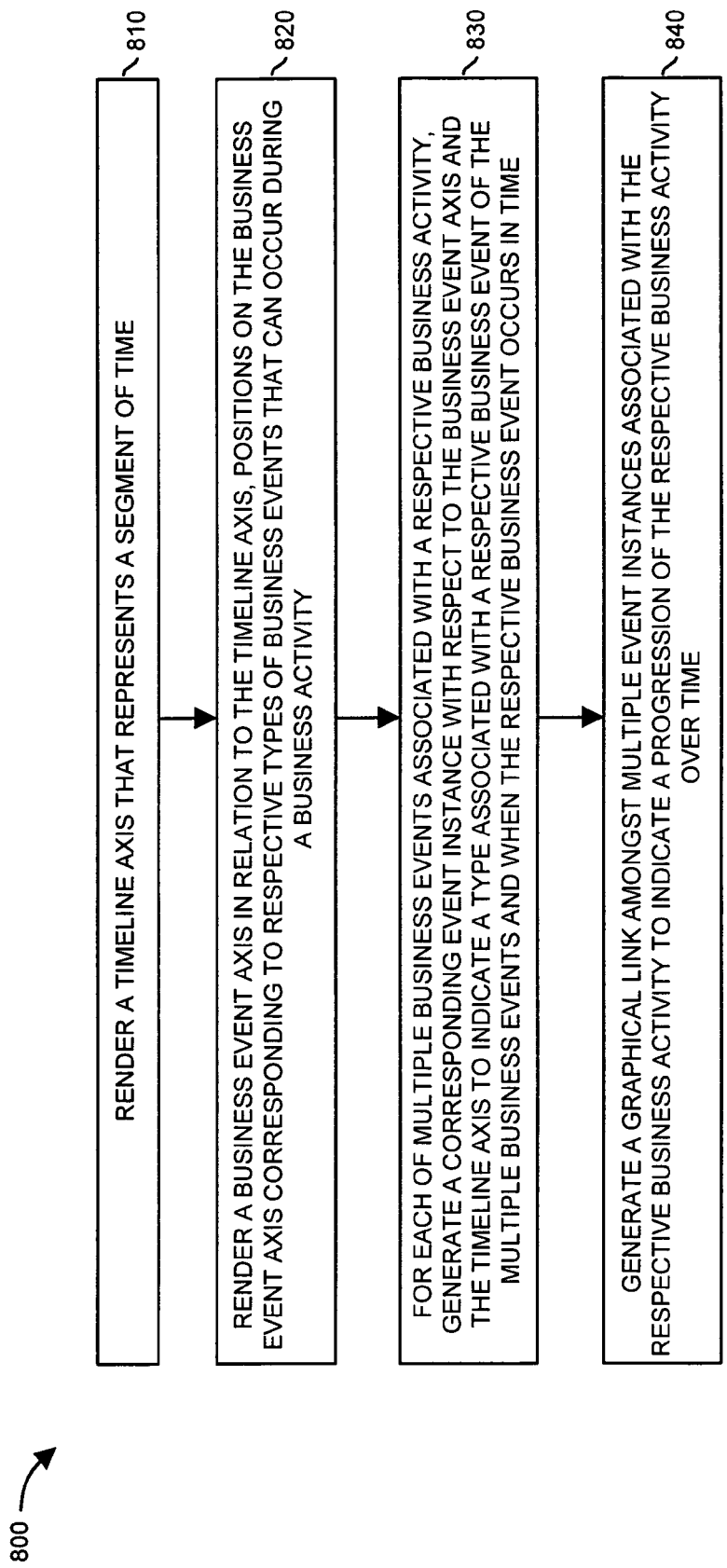
FIG. 8 is a flowchart illustrating techniques associated with charting events according to an embodiment herein.

FIG. 8 is a flowchart 800 illustrating a technique for creating a chart for a business activity according to an embodiment herein. Note that flowchart 800 of FIG. 8 will include references to matter previously discussed with respect to FIGS. 1-7.

In step 810, charting application 140 renders a timeline axis 103 (see FIG. 1) that represents a segment of time.

In step 820, charting application 140 renders a business event axis 102 in relation to the timeline axis 103. Positions on the business event axis 102 correspond to respective types of business events (e.g., event type A, event type B, etc.) that can occur during a respective activity 141 (e.g., a business activity flow).

In step 830, for each of multiple business events associated with a respective business activity, charting application 140 generates a corresponding event instance (e.g., event instance 121-1) with respect to the business event axis 102 and the timeline axis 103 to indicate a type associated with a respective business event of the multiple business events (associated with the business activity) and when the respective business event occurs in time.

In step 840, charting application 140 generates a graphical link (e.g., link 131-1 and link 131-2) amongst multiple event instances associated with the respective business activity 141 to indicate a progression of the respective activity over time.

Figure 9:
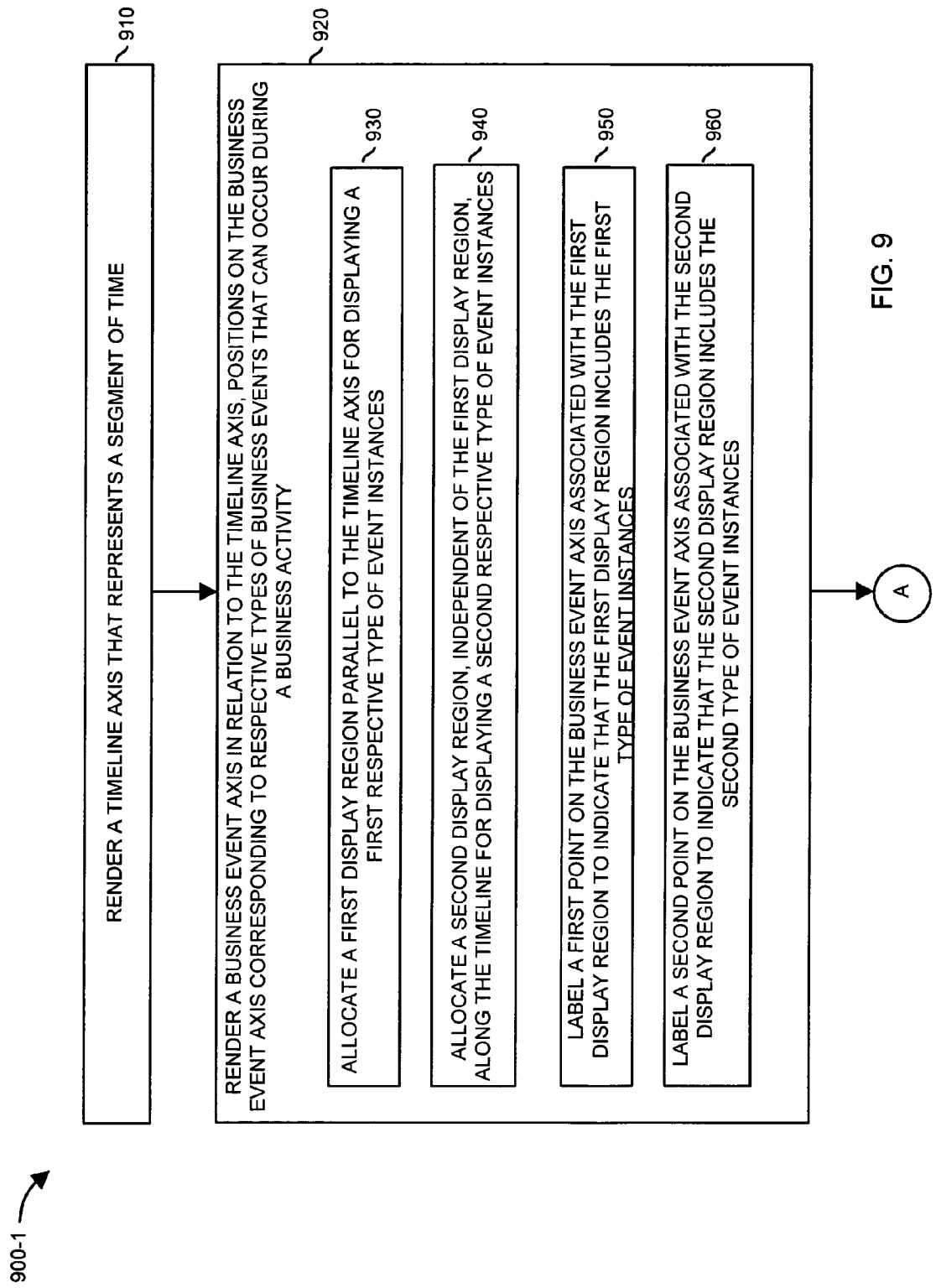
FIGS. 9 and 10 combine to form a more detailed flowchart illustrating techniques for charting events associated with an embodiment herein.
Figure 10:
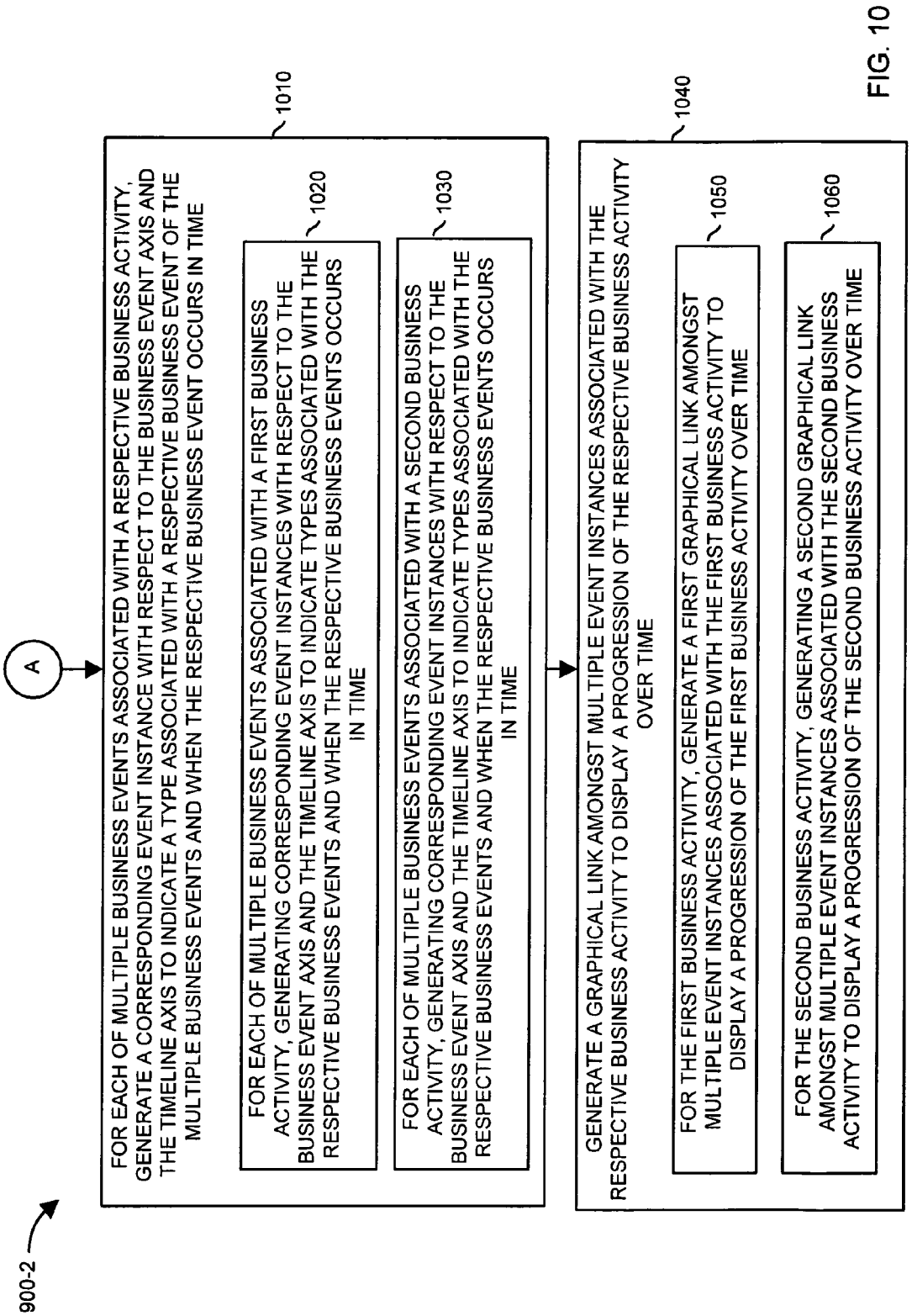

FIGS. 9 and 10 combine to form a flowchart 900 (e.g., flowchart 900-1 and flowchart 900-2) illustrating more specific techniques according to embodiments herein. The steps in flowchart 900 can be are performed by computer system 110 or charting application 140-1.

In step 910 of flowchart 900-1 of FIG. 9, charting application 140-1 renders (e.g., chart 105) including a timeline axis 102 that represents a segment of time.

In step 920, charting application 140 renders a business event axis 102 in relation to the timeline axis 103. Positions on the business event axis 103 correspond to respective types of business events (e.g., event type A, event type B, and so on) that can occur during a respective business activity.

In sub-step 930 of step 920, charting application 140 allocates a first display region 115-1 parallel to the timeline axis 103 for displaying a first respective type (e.g., type A events) of event instances associated with business activity flows.

In sub-step 940 of step 920, charting application 140 allocates a second display region 115-2, independent of the first display region 115-1, along the timeline axis 102 for displaying a second respective type (e.g., type B events) of event instances associated with business activity flows. Flow chart 900 can include additional steps to allocate display regions for other types of events as well.

In sub-step 950 of step 920, charting application 140 labels a first point on the business event axis 103 associated with the first display region 115-1 to indicate that the first display region 115-1 includes the first type (e.g., type A) of event instances.

In sub-step 960 of step 920, charting application 140 labels a second point on the business event axis 103 associated with the second display region 115-2 to indicate that the second display region 115-2 includes the second type (e.g., type B) of event instances. Flow chart 900 can include additional steps to label the business event axis 102 with other types of events as well.

In step 1010 of flowchart 900-2 of FIG. 9, for each of multiple business events associated with a respective business activity, charting application 140 generates a corresponding event instance (e.g., event instances 121 such as event markers) with respect to the business event axis 102 and the timeline axis 103 to indicate a type associated with a respective business event of the multiple business events and when the respective business event occur in time.

In sub-step 1020 associated with step 1010, for each of multiple business events associated with a first business activity (e.g., activity 141), the charting application 140 generates corresponding event instances 121 with respect to the business event axis 102 and the timeline axis 103 to indicate types associated with the respective business events and when the respective business events occur in time.

In sub-step 1030 associated with step 1010, for each of multiple business events associated with a second activity 143, the charting application 140 generates corresponding event instances with respect to the business event axis 102 and the timeline axis 103 to indicate types associated with the respective business events and when the respective business events occur in time.

In step 1040, the charting application 140 generates a graphical link amongst multiple event instances associated with the respective activity to display a progression of the respective business activity over time.

For example, in sub-step 1050 associated with step 1040, for the first business activity 141, the charting application 140 generates a first graphical link (e.g., a combination of links 131) amongst multiple event instances associated with the first activity 141 to display a progression of the first business activity over time.

In sub-step 1060 associated with step 1040, for the second business activity 143, the charting application 140 generates a second graphical link (e.g., a combination of links 133) amongst multiple event instances associated with the second business activity 143 to display a progression of the second business activity over time.

Note again that techniques herein are well suited for presenting event information in a chart for purposes of business activity monitoring as well as reviewing occurrence of real-time events that trigger rules in a rule-base system. However, it should be noted that embodiments herein are not limited for use in such applications and that the techniques discussed herein are well suited for other purposes as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims. Also, embodiments herein include a combination of any of the techniques discussed above.

What is claimed is:

1. A method of, the method comprising:
   rendering on an electronic display a timeline axis that represents a segment of time;
   rendering on the electronic display a business event axis in relation to the timeline axis, positions on the business event axis corresponding to respective types of business events that can occur during a first business activity and a second business activity, where the first and second business activities include a succession of multiple business events such that the first and second business activities include at least one business event of the same business event type;
   for each of the multiple business events associated with the first business activity and the second business activity, generating on the electronic display a corresponding event instance with respect to the business event axis and the timeline axis to indicate a type of business event and a time at which the respective business event occurred; and
   generating on the electronic display a first graphical link amongst the multiple event instances associated with the first business activity to indicate a progression of the first business activity over time;
   generating on the electronic display a second graphical link amongst the multiple event instances associated with the second business activity to indicate a progression of the second business activity over time;
   displaying the timeline axis, the business event axis, event instances, and the first graphical link and the second graphical link on the electronic display.

2. The method of claim 1, wherein generating a corresponding event instance includes:
   for at least two of the multiple business events associated with the first business activity, generating corresponding event instances with respect to the business event axis and the timeline axis to indicate types of business events and a time at which the respective business events occurs in time; and
   for at least two of the multiple business events associated with the second business activity, generating corresponding event instances with respect to the business event axis and the timeline axis to indicate types of business events and a time at which the respective business events occurs in time.

3. The method of claim 1, wherein rendering the business event axis includes:
   allocating a first display region parallel to the timeline axis for displaying a first respective type of business event;
   allocating a second display region, independent of the first display region, along the timeline axis for displaying a second respective type of business event.

4. The method of claim 3 further comprising:
   labeling a first point on the business event axis to indicate that the first display region includes the first type of business events; and
   labeling a second point on the business event axis to indicate that the second display region includes the second type of business events.

5. The method of claim 1, wherein rendering the business event axis includes:
   identifying a logical sequence of different business event types associated with the first business activity and the second business activity;
   for each business event type in the logical sequence of different business event types, labeling a respective point on the business event axis such that the different business event types on the business event axis progress from an initial business event type to an end business event type.

6. The method of claim 1 further comprising:
   differentiating the first business activity from the second business activity based on at least one of i) a color and ii) a pattern.

7. The method of claim 1 further comprising:
   generating event instances associated with the first business activity or the second business activity for fewer than all of the respective types of business events that can occur during the first business activity and the second business activity as indicated by the business event axis.

8. The method of claim 1, wherein rendering the business event axis includes generating the business event axis to include a first contiguous sequence of positions associated with the first business activity and a second contiguous sequence of positions associated with the second business activity, the first business activity being independent of the second business activity; and
   where the first graphical link is disconnected from the second graphical link.

9. The method of claim 1, wherein rendering the business event axis includes labeling a first position of the business event axis with a first event type and a second position of the business event axis with a second event type, the first position of the business event axis being used to identify event instances of the first event type and the second position of the business event axis being used to identify event instances of the second event type; and
   wherein generating the graphical link includes, i) generating a first link connecting a first event instance of the first event type to a second event instance of the second event type, and ii) generating a second link connecting the first event instance of the first event type to a third event instance of the second event type.

10. The method of claim 1 further comprising:
    providing a display region in relation to at least one type of business event on the business event axis; and
    in response to a user selecting the display region, initiating minimization of the at least one type of business events on the business event axis and removal of respective at least one type of business event displayed for the first business activity and the second business activity.

11. The method of claim 1, wherein generating the graphical link includes illustrating a causal ordering of the multiple business events and when each of the multiple business events occurs in succession in real-time.

12. A computer program product including a computer-readable medium having instructions stored thereon for processing data information, such that the instructions, when carried out by a processing device, enable the processing device to perform the operations of:

on a chart, rendering a timeline axis that represents a segment of time;

rendering a business event axis in relation to the timeline axis, positions on the business event axis corresponding to respective types of business events that can occur during a first business activity and a second business activity; generating event instances associated with the first business activity and the second business activity, where the first and second business activities include a succession of multiple business events such that the first and second business activities include at least one business event of the same business event type;

for each of multiple business events associated with the first business activity and the second business activity, generating a corresponding event instance with respect to the business event axis and the timeline axis to indicate a type of business event and a time at which the respective business event occurs in time; and generating a graphical link amongst multiple event instances associated with the first business activity and the second business activity to indicate a progression of the first business activity and the second business activity over time.

13. The computer program product of claim 12 further supporting operations of:

generating event instances associated with the first business activity and the second business activity for fewer than all of the respective types of business events that can occur during the first business activity and the second business activity as indicated by the business event axis; and wherein generating the graphical link amongst the event instances includes, via the graphical link, connecting the event instances but skipping connection to at least one type of business event identified by the business event axis.

14. The computer program product of claim 12, wherein rendering the business event axis includes generating the business event axis to include a first contiguous sequence of positions associated with the first business activity and a second contiguous sequence of positions associated with the second business activity, the first business activity being independent of the second business activity; and where the first graphical link is disconnected from the second graphical link.

15. The computer program product of claim 12, wherein rendering the business event axis includes labeling a first position of the business event axis with a first business event type and a second position of the business event axis with a second business event type, the first position of the business event axis being used to identify event instances of the first event type and the second position of the business event axis being used to identify event instances of the second event type; and wherein generating the graphical link includes, for the business activity, i) generating a first link connecting a first event instance of the first event type to a second event instance of the second business event type, and ii) generating a second link connecting the first event instance of the first event type to a third event instance of the second business event type.

16. The computer program product of claim 12 further supporting operations of:

providing a display region in relation to at least one type of business events on the business event axis; and in response to a user selecting the display region, initiating minimization of the at least one type of business events on the business event axis and removal of respective at least one type of business events displayed for the first business activity and the second business activity.

17. A computer system comprising:

a processor;

a memory unit that stores instructions associated with an application executed by the processor; and an interconnect coupling the processor and the memory unit, enabling the computer system to execute the application and perform operations of:

rendering a timeline axis that represents a segment of time;

rendering on a business event axis in relation to the timeline axis, positions on the business event axis corresponding to respective types of business events that can occur during a first business activity and a second business activity, where the first and second business activities include a succession of multiple business events such that the first and second business activities include at least one business event of the same business event type;

for each of multiple business events associated with the first business activity and the second business activity, generating a corresponding event instance with respect to the business event axis and the timeline axis to indicate a type of business event and a time at which the respective business event occurs in time; and generating a graphical link amongst multiple event instances associated with the first business activity and the second business activity to indicate a progression of the respective business activity over time, where the graphical link connects a series of event instances associated with business events corresponding to the first business activity or the second business activity.

18. The computer system of claim 17, wherein rendering the business event axis includes labeling a first position of the business event axis with a first event type and a second position of the business event axis with a second event type, the first position of the business event axis being used to identify event instances of the first event type and the second position of the business event axis being used to identify event instances of the second event type; and wherein generating the graphical link includes, i) generating a first link connecting a first event instance of the first event type to a second event instance of the second event type, and ii) generating a second link connecting the first event instance of the first event type to a third event instance of the second event type.

19. The computer system of claim 17 that further performs operations of:

providing a display region in relation to at least one type of business events on the business event axis; and in response to a user selecting the display region, initiating minimization of the at least one type of business events on the business event axis and removal of respective at least one type of business events displayed for the first business activity and the second business activity.

20. The method of claim 1, wherein generating the graphical link amongst the event instances includes, via the graphical link, connecting the event instances but skipping connection to at least one type of business event identified by the business event axis.

21. The computer program product of claim 12 further supporting operations of:

generating event instances associated with the first business activity or the second business activity for fewer than all of the respective types of business events that can occur during the first business activity and the second business activity as indicated by the business event axis.

22. The system of claim 17 that further performs operations of:

generating event instances associated with the first business activity or the second business activity for fewer than all of the respective types of business events that can occur during the first business activity and the second business activity as indicated by the business event axis.

* * * * *